Aug. 13, 1957 H. P. BECTON 2,802,670

RECORD ASSEMBLY

Filed June 16, 1953

INVENTOR:
HENRY P. BECTON

United States Patent Office 2,802,670
Patented Aug. 13, 1957

2,802,670

RECORD ASSEMBLY

Henry P. Becton, Rutherford, N. J.

Application June 16, 1953, Serial No. 362,485

6 Claims. (Cl. 274—42)

This invention relates to a structurally and functionally improved phonographic record assembly.

It is an object of the invention to provide a linkage or connection between two or more records so that these units will be coupled in a certain and substantially permanent manner. Therefore, with these records being part of a set in which the individual disks should be played in a predetermined sequence, it is apparent that not alone will the complete grouping be instantly available to a user but also the proper sequence will be maintained.

A further object is that of providing a structure whereby the foregoing results may be achieved and which will, in no manner, interfere with the automatic shifting or delivery of a record disk by means of conventional record changing apparatus.

Still another object is that of furnishing an assembly which may readily be provided by quantity production methods with minimum expense and which will have an effective life equal to that of the record set.

With these and other objects in mind, reference is had to the attached sheet of drawings illustrating practical embodiments of the invention and in which.

Figure 1:
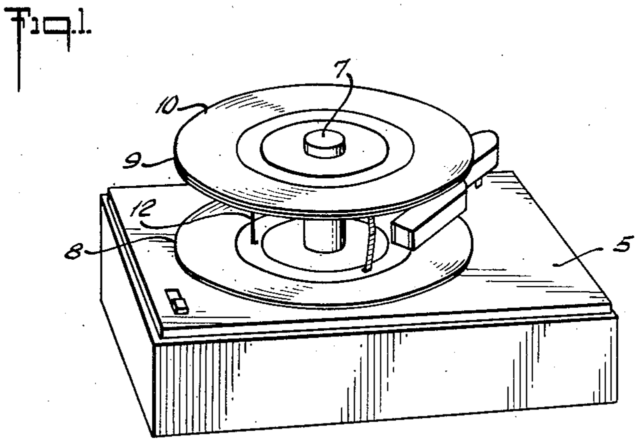
Fig. 1 shows in somewhat schematic manner a perspective of a simple record player with which there is associated a record assembly.

In these views, the numeral 5 indicates the cabinet of a record player above which a rotatable turntable 6 extends. Projecting through the latter is a spindle 7. The mechanism will, moreover, include a tone arm embracing a record-traversing stylus and a suitable changing mechanism or releasing structure whereby record disks or platters may be sequentially deposited upon or at a position adjacent turntable 6. As is well understood, such mechanism conventionally functions in response to the tone arm moving to a position such that its stylus is traversing the last several convolutions of the tone groove of the record. In that position, the "pick-up" head may oscillate. This results in accordance with conventional practice in a cycling of the mechanism as a consequence of which the tone arm swings upwardly and outwardly while the changing mechanism releases the next successive record of a stack to assume a position adjacent the upper surface of the turntable. Finally, the tone arm moves downwardly to a position where its stylus engages the initial convolution of the so-delivered record.

For purposes of illustration, three records have been shown constituting a complete grouping of a disk set. As is to be understood, such a set may comprise two or any larger number of records; the presently illustrated grouping of three being merely a simple and readily understood exemplification.

Thus, the numerals 8, 9 and 10 indicate record disks, each of which have upon their faces spirally disposed reproducing grooves 11. Such a record set ordinarily embraces serially related matter on its several disks and which is to be acoustically reproduced in a given disk sequence. To this end, the disks are usually provided with labels which identify the selections and also the sequence in which the records are to be played. These labels have not been included as part of the present illustration in that their character and purpose is well known. However, each of the disks has been shown as including the conventional spindle-accommodating aperture which is centrally located.

According to the present teachings, the individual records of a group are connected together by suitable linkage, so that while they may not be separated, they will have limited movements with respect to each other. One form of such linkage may include, as shown, flexible strips 12 which are connected in any proper manner to the several consecutive disks. These strips are formed of any suitable material, and as shown, have their bodies and ends passing through openings in the disks and secured adjacent such openings by, for example, staples 13. Obviously, any other proper connection, of a preferably permanent nature, may be employed. However, it is preferred strips 12 be utilized rather than cords and that the bodies of these strips, at points substantially centrally of the points at which they are attached to adjacent records, be biased or formed so that they have a tendency to move outwardly from their points of connection with the disk bodies.

Figures 2, 3, 4, 5:
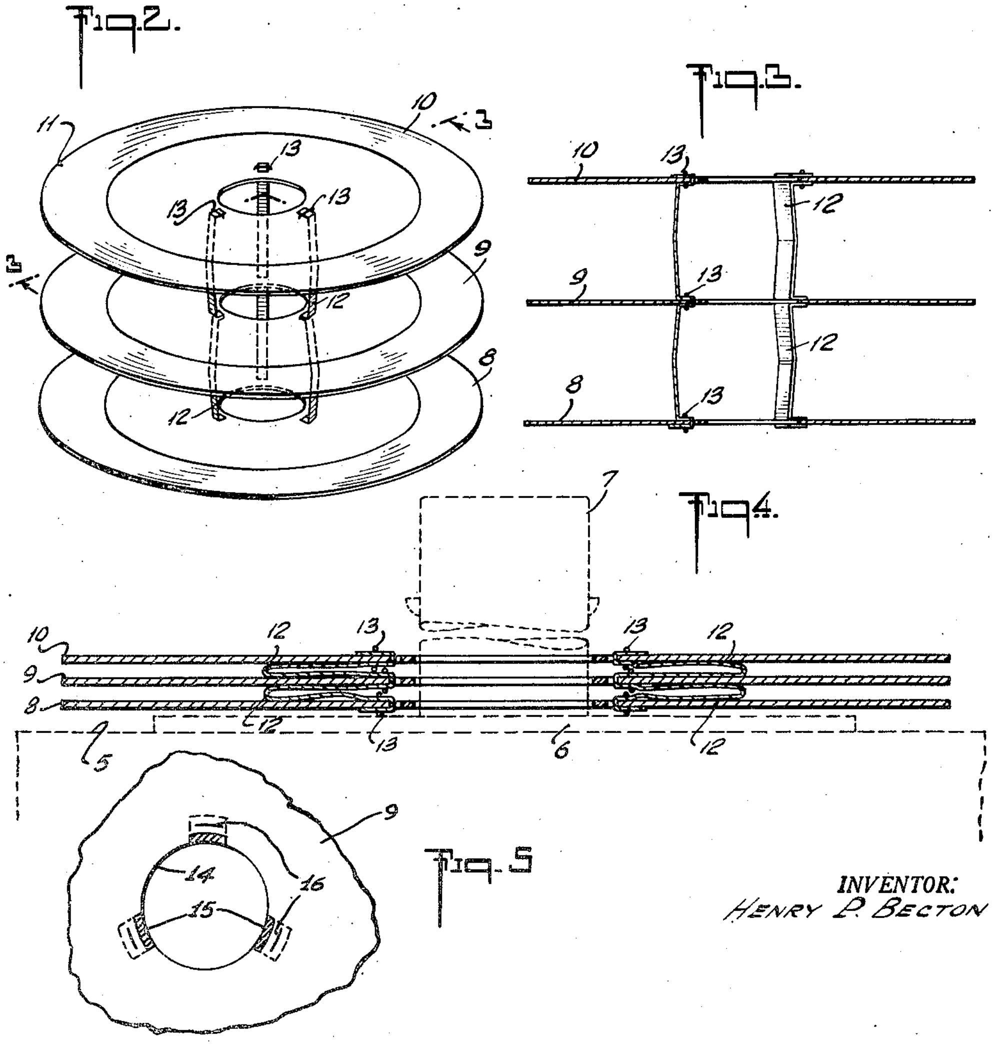
Fig. 2 is a perspective view of that assembly with the disks in separated condition.
Fig. 3 is a transverse sectional view taken along the line 3—3 in the direction of the arrows as indicated in Fig. 2.
Fig. 4 is a sectional side view of a stack of records embodying the teachings of the present invention.
Fig. 5 is a fragmentary face view of an alternative form of structure.

As shown, those points of connection are preferably immediately beyond the apertures of the records. By their tendency to bulge or fold outwardly, the strips 12 will never move into positions such that they will obstruct the spindle openings. Thus, they will not bind between the edges of those apertures and the spindle 7, nor will they interfere in any manner with the changing mechanism associated with that spindle. Rather, as shown in Figs. 1 and 4, they will lie flat between records immediately adjacent each other and will extend outwardly from the apertures or else—and when the records are separated—they will lie between those records as shown particularly in Figs. 2 and 3.

Accordingly, it is apparent that two or more records comprising a set will always be maintained in association with each other. Also, the sequence under which the different faces of the disks should be played or reproduced will always be preserved. Moreover, the liability of breakage will be reduced in that a grouping of records will always be handled rather than individual and relatively light single platters or disks.

An operator will merely have to determine which is the first face or record of the platter to be produced and arrange it lowermost with the entire stack on the spindle 7. Thereafter, that platter is disposed with its face uppermost upon the turntable 6 of an apparatus such as illustrated in Fig. 1. The remaining disks will be retained in elevated position above the playing station as shown in this figure and the stylus of the tone arm will traverse the sound grooves 11 of the lowermost platter in the usual manner as the turntable rotates. During such rotation, it will be observed that the connecting strips or links 12 remain in positions at which they extend substantially perpendicular between the record which is upon the turntable and the succeeding record retained in elevated position. Therefore, they will not contact and interfere with the tone arm.

After the entire groove of the first record 8 has been traversed, the tone arm will shift and the releasing mechanism will function to permit the second record to drop from the stacked position to a point where it is supported by the turntable 6. As that second record moves to lowered position, the strips 12 will fold outwardly between it and the lower record. This has been shown especially in Fig. 4 in which it is apparent, the intervening strips will not interfere with the downward passage of the record over the spindle nor the record releasing or changing mechanism associated with the latter. They will, however, serve to cushion any damaging shocks between that record and the preceding one. After the complete pack has been played, it may be lifted and reversed and the entire sequence of operations repeated, so that the complete selection embodied in the assembly of records will be played. Thereupon, this stack of records may be suitably filed in an envelope, book or otherwise. So filled, it will be readily accessible as a unit assembly for further use.

Referring to Fig. 5, there has been shown an alternative form of structure as applied to the central disk or record 9. In this view, the numeral 14 indicates the edge of the circular opening accommodating the spindle 7. This edge is interrupted by notches. Disposed within the latter are tapes or connecting elements 15 corresponding to the strips 12. These units may be attached to the record 9 in any desired manner. For example, and as shown, staples 16 secure them in face-to-face contact with the surfaces of the disk at points immediately adjacent the notches. So secured, the inner surfaces of the connecting elements may—if desired—extend as continuations of the edge 14. They may, of course, be slightly recessed or moved outwardly from that edge.

In any event, in common with the strips 12 of Figs. 1 to 4, the elements or strips 16 should incorporate a bias or tendency to fold outwardly as the records are moved towards each other. Quite aside from this, however, they will incorporate such a tendency incident to the manner in which they are fastened to the disks. As shown, three strips are in each instance employed and these are equally spaced. It is apparent that a greater or lesser number might be utilized and could be spaced as desired so long as adequate stability or support is provided in order that the records may remain substantially parallel when in use.

By utilizing the structure herein taught, it is entirely feasible to eliminate certain of the labels as heretofore applied to the records. In other words, it will only be necessary to use one label although preferably labels are applied to the outer faces of the two outermost disks or platters of the assembly. So applied, they may contain all necessary data and information. As will be apparent in connection with strips 12 and 15, any desired securing means may be employed in lieu of staples or fastening units 13 and 16. Also, the connection thus established may be immediately adjacent the surface of opening 14 or the notches.

Thus, among others, the several objects of the invention as specifically aforenoted are achieved. Obviously, numerous changes in construction and rearrangement of the parts may be resorted to without departing from the spirit of the invention as defined by the claims.

I claim:

1. A record assembly including at least a pair of disks, each having a spiral sound groove upon its face and a spindle-accommodating opening through its body, said disks being adapted to be supported upon the spindle of a reproducing apparatus and sequentially disposed thereafter upon the turntable of that apparatus to have their sound grooves traversed by the "pick-up" head of the same, means independent of said apparatus and permanently connecting said disks whereby one of the same is disposable upon the turntable to rotate with the latter, the second of said disk pair being supported by the spindle above and spaced from said turntable and said connecting means having parts movable with respect to said disks whereby the second of said disk pair may shift towards said first disk to be supported by and move with the turntable of the apparatus.

2. A record assembly as specified in claim 1, said assembly comprising flexible strips connected to said record disks and constituting said connecting means.

3. A record assembly as specified in claim 2, said strips being biased to fold outwardly and extend substantially parallel to the surface of the disks when the latter are both supported on the turntable.

4. A record assembly as specified in claim 1, said connecting means comprising strips of flexible material, said strips being secured adjacent said disk openings and at a point inwardly of the sound groove of the disk.

5. A record assembly including in combination at least two record disks, each provided with a spindle-accommodating opening and having spiral sound grooves formed in their faces, a connecting strip extending between the adjacent faces of different disks, the ends of said strips being secured to one of said disks at points between the end of the sound groove and the opening formed therein, said strip being flexible and of a length such that the discs may be separated to space the adjacent faces thereof a substantial distance from each other.

6. A record assembly including in combination at least two record disks, each provided with a spindle-accommodating opening and having spiral sound grooves formed in their faces, a plurality of connecting strips extending between the adjacent faces of different disks, the ends of said strips being secured to one of said disks at points between the end of the sound groove and the opening formed therein, the bodies of said strips intervening the adjacent faces of said discs being flexible, the flat faces of said strips extending substantially perpendicular to lines projecting radially from the openings of said discs, whereby such strips are caused to assume positions folded outwardly from said openings when said disks are moved to positions adjacent each other.

References Cited in the file of this patent

UNITED STATES PATENTS

| | | |
|---|---|---|
| 877,842 | Higley | Jan. 28, 1908 |
| 1,502,312 | Mayhew | July 22, 1924 |
| 2,366,940 | Solkover | Jan. 9, 1945 |
| 2,559,786 | Mueller | July 10, 1951 |